United States Patent
Buerkner et al.

(10) Patent No.: US 10,052,828 B2
(45) Date of Patent: Aug. 21, 2018

(54) SUPPORTING PROFILED ELEMENT, METHOD FOR PRODUCING A SUPPORTING PROFILED ELEMENT, AND USE OF SAID SUPPORTING PROFILED ELEMENT IN A METHOD FOR PRODUCING A REINFORCED VEHICLE FUSELAGE COMPONENT

(71) Applicants: Steffen Buerkner, Munich (DE); Jochen Scholler, Grossaitingen (DE); Erik Hansen, Augsburg (DE)

(72) Inventors: Steffen Buerkner, Munich (DE); Jochen Scholler, Grossaitingen (DE); Erik Hansen, Augsburg (DE)

(73) Assignee: PREMIUM AEROTEC GMBH, Augsburg (DE)

( * ) Notice: Subject to any disclaimer, the term of this patent is extended or adjusted under 35 U.S.C. 154(b) by 473 days.

(21) Appl. No.: 14/737,562

(22) Filed: Jun. 12, 2015

(65) Prior Publication Data

US 2015/0283765 A1 Oct. 8, 2015

Related U.S. Application Data

(62) Division of application No. 13/704,698, filed as application No. PCT/DE2011/001346 on Jun. 16, 2011, now Pat. No. 9,815,246.

(30) Foreign Application Priority Data

Jun. 17, 2010 (DE) ........................ 10 2010 024 120

(51) Int. Cl.
*B29C 33/50* (2006.01)
*B29C 70/44* (2006.01)
(Continued)

(52) U.S. Cl.
CPC ............ *B29C 70/443* (2013.01); *B29C 33/50* (2013.01); *B29C 33/505* (2013.01); *B29C 70/44* (2013.01);
(Continued)

(58) Field of Classification Search
CPC .................................................... B29C 33/505
USPC ......................................... 156/156; 269/48.1
See application file for complete search history.

(56) References Cited

U.S. PATENT DOCUMENTS 3,642,020 A  2/1972 Payne
3,814,135 A  6/1974 Hetzer et al.
(Continued)

FOREIGN PATENT DOCUMENTS

DE  10156123 A1  5/2003
DE  102006035619 B3  11/2007
(Continued)

OTHER PUBLICATIONS

European patent office; International Search Report in International Patent Application No. PCT/DE2011/001346 (dated Feb. 2, 2012).

Primary Examiner — Scott W Dodds
(74) Attorney, Agent, or Firm — Leydig, Voit & Mayer, Ltd.

(57) ABSTRACT

Method for producing a supporting profiled element configured to support a reinforcing profiled element that is formed from a fiber composite semi-finished product during a curing process of a method for producing a vehicle fuselage component, in which the reinforcing profiled element is bonded to a surface of a fuselage shell that is formed from a fiber composite semi-finished product. The method includes providing a profiled hose and detachably inserting end pieces at the two ends of the profiled hose, so as to seal the end pieces to the profiled hose by means of respective insertion connections.

2 Claims, 3 Drawing Sheets

(51) Int. Cl.
*B29D 99/00* (2010.01)
*B29L 31/30* (2006.01)
*B64C 1/00* (2006.01)
*B29K 63/00* (2006.01)
*B29K 105/08* (2006.01)

(52) U.S. Cl.
CPC ........ *B29C 70/446* (2013.01); *B29D 99/0014* (2013.01); *B29K 2063/00* (2013.01); *B29K 2105/0872* (2013.01); *B29L 2031/3082* (2013.01); *B64C 2001/0072* (2013.01); *Y02T 50/433* (2013.01); *Y10T 29/49826* (2015.01); *Y10T 156/10* (2015.01)

(56) References Cited

U.S. PATENT DOCUMENTS

| | | |
|---|---|---|
| 3,900,810 A | 8/1975 | Grenier |
| 4,425,698 A | 1/1984 | Petrie |
| 7,727,449 B2 | 6/2010 | Lorenz et al. |
| 7,837,818 B2 * | 11/2010 | Fresnel ................ B29C 61/025 156/203 |
| 2007/0011970 A1 | 1/2007 | Hethcock et al. |
| 2010/0028480 A1 | 2/2010 | Jacob et al. |
| 2010/0186899 A1 | 7/2010 | Jackson et al. |
| 2011/0042863 A1 | 2/2011 | Cavaliere |
| 2011/0076461 A1 | 3/2011 | Jacob et al. |
| 2011/0272086 A1 | 11/2011 | Dittman et al. |
| 2012/0235336 A1 | 9/2012 | Sana et al. |

FOREIGN PATENT DOCUMENTS

| | | |
|---|---|---|
| DE | 102006031334 A1 | 1/2008 |
| DE | 102008054540 A1 | 6/2010 |
| FR | 2924375 A1 | 6/2009 |
| WO | WO 2008015115 A1 | 2/2008 |
| WO | WO 2010060850 A2 | 6/2010 |
| WO | WO 2011055524 A1 | 5/2011 |

* cited by examiner

SUPPORTING PROFILED ELEMENT, METHOD FOR PRODUCING A SUPPORTING PROFILED ELEMENT, AND USE OF SAID SUPPORTING PROFILED ELEMENT IN A METHOD FOR PRODUCING A REINFORCED VEHICLE FUSELAGE COMPONENT

CROSS REFERENCE TO RELATED APPLICATIONS

This application claims priority to and is a divisional of U.S. patent application Ser. No. 13/704,698, filed on Feb. 18, 2013, which is a U.S. National Phase application under 35 U.S.C. § 371 of International Application No. PCT/DE2011/001346, filed on Jun. 16, 2011, and claims benefit to German Patent Application No. DE 10 2010 024 120.2, filed on Jun. 17, 2010. The International Application was published in German on Jan. 26, 2012, as WO 2012/010134 A1 under PCT Article 21 (2).

FIELD

The present invention relates to a supporting profiled element, a method for producing a supporting profiled element, and a method for producing a reinforced vehicle fuselage component.

BACKGROUND

A supporting profiled element of the type in question is known for example from DE 101 56 123 B4. This supporting profiled element is used to support a reinforcing profiled element, which is formed from a fibre composite semi-finished product, in a curing process of a method for producing a cover element (for example for an aeroplane) which is reinforced by the reinforcing profiled element. In this curing process, the reinforcing profiled element is bonded (what is known as "co-bonding" or "co-curing") to a surface of the cover element, which is also formed from a fibre composite semi-finished product.

In general, there is a need for a supporting profiled element of this type whenever there is the risk of the reinforcing profiled element deforming during the curing process as a result of the shaping of the reinforcing profiled element which is to be bonded. In this context, it should be noted that in fibre composite methods of this type, the "substrate" (for example the fuselage shell of a vehicle fuselage component) is generally introduced, together with the reinforcing profiled element which is bonded thereto, into a casing, which is subjected to pressure from the outside.

The reinforcing profiled element can be prevented from deforming in this manner by the supporting profiled element, which extends parallel to the reinforcing profiled element and contacts it at least in portions.

With a view to the advantage expected from fibre composite technology of a high specific strength of the fibre composite component which is to be produced, a supporting profiled element which is used during production should be removed again once the fibre composite semi-finished product has been cured and connected. In the production of the fibre composite component as disclosed in DE 101 56 123 B4, the supporting profiled element which is used in this context can be drawn out, for example laterally, from an intermediate space of the approximately C-shaped reinforcing profiled element once the fibre composite semi-finished product has been cured. The supporting profiled element could for example be manufactured from metal (for example aluminium), for example as a milled metal part.

By contrast, however, shapings and arrangements of reinforcing profiled elements which do not make it possible to remove the supporting profiled element sideways (transverse to the longitudinal direction of the reinforcing profiled element) after curing, because it is "caught" between the substrate and the reinforcing profiled element in this direction, are also conceivable in a curing process of this type.

In particular in a case of this type, it may be provided that the supporting profiled element is drawn out in the longitudinal direction of the reinforcing profiled element, rather than the transverse direction, after the substrate and the reinforcing profiled element have been cured. However, in many cases this requires that the supporting profiled element is manufactured from a flexible material, rather than a rigid material such as aluminium, so as to ensure sufficient flexibility of the supporting profiled element for it to be drawn out. A flexible supporting profiled element is therefore often required, in particular in the production of vehicle fuselage components which are curved in a complicated manner (for example cover panels of aircraft, etc.).

"Rubbercraft Corporation of California", USA, supplies such flexible supporting profiled elements manufactured from an elastomeric material or single-piece bladders up to 14.6 m in length ("single piece bladders up to 48' in length") for use in the production of composite constructions and composite components (website www.rubbercraft.com/tooling.htm as of 10 May 2010). When supporting profiled elements of this type are used, which are manufactured so as to be tailored for a very specific application, they are affected to some degree, in such a way that they can generally be used at most a few times for component production of the type in question. This results in high costs for providing the required number of supporting profiled elements, in particular in the mass production of vehicle fuselage components, which are each provided with one or more reinforcing profiled elements.

SUMMARY

In an embodiment, the present invention provides a method for producing a supporting profiled element configured to support a reinforcing profiled element that is formed from a fiber composite semi-finished product during a curing process of a method for producing a vehicle fuselage component, in which the reinforcing profiled element is bonded to a surface of a fuselage shell that is formed from a fiber composite semi-finished product, the method comprising: providing a profiled hose and detachably inserting end pieces at the two ends of the provided profiled hose, so as to seal the end pieces to the profiled hose by means of respective insertion connections.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 is a detail from FIG. 2, FIGS. 4 to 6 are various perspective views of an end piece according to a first variant which can be used in a production method according to FIGS. 1 to 3, and FIGS. 7 to 9 are various perspective views of an end piece according to a second variant which can be used in a production method according to FIGS. 1 to 3.

DETAILED DESCRIPTION

An aspect of the present invention is to provide a supporting profiled element of the aforementioned type, which can be provided in a simple and cost-effective manner and which can advantageously be used, in particular, in the production of a reinforced vehicle fuselage component using fibre composite technology.

The supporting profiled element according to the invention comprises an air-impermeable profiled hose and at least one end piece, which is detachably inserted at one of the two ends of the profiled hose and is sealed against the profiled hose by means of this insertion connection. If an end piece of this type is only provided at one end of the profiled hose, the other end of the profiled hose can for example be closed, and thus sealed, by welding or gluing the profiled hose material.

However, in a particularly preferred embodiment, the supporting profiled element according to the invention comprises detachably inserted end pieces, which are sealed against the profiled hose by means of this insertion connection, at both ends of the profiled hose.

By using a profiled hose, sufficient flexibility of the supporting profiled element for the respective application can be achieved, depending on the shaping (for example wall thickness) and type of the profiled hose material. Preferably, the profiled hose is manufactured, for example extruded, from polymer material (for example silicone). One or more materials can be processed (for example in a co-extrusion process) so as to produce the hose. In particular, the surface of the hose for example may be specially treated so as to form a "functional layer" (anti-adhesion layer) and/or may be formed from a special material, which is different from the material beneath it. In this way, it can be made easier to slide the hose out from the cured matrix material subsequently when the supporting profiled element is removed after the curing process is complete. The surface may for example be formed by a fluoropolymer layer. It is also possible to turn to measures which are known per se for mechanically reinforcing the hose, for example in that one or more reinforcing layers (for example fibre nettings, etc.) or other reinforcing elements are introduced into a flexible hose material.

By contrast, the end piece or pieces which are detachably inserted (at one or both ends of the profiled hose) may be manufactured from a more rigid material, preferably for example from a metal material such as aluminium. As a result of the sealing, provided by means of this insertion connection, between the profiled hose and the end piece(s), a particular pressure can advantageously be maintained or set in the hose interior during the curing process, and this ensures or increases the dimensional stability of the supporting profiled element.

As will be explained in greater detail below in the description of embodiments, the sealing provided by means of the insertion connection itself need not be "perfect", in the sense that this sealing will substantially resist an (air) pressure difference between the hose interior and the hose exterior which occurs during the subsequent curing process. Rather, it is sufficient for this degree of sealing effect only to be achieved in the curing process itself, in that during said process the ends of the profiled hose are pressed sufficiently strongly against the portions of the end pieces which they enclose.

The materials which are used for the profiled hose and the end piece or pieces should be selected in such a way that they resist the conditions which are to be expected in the curing process. For example, in current curing processes for fibre composite components based on epoxy resin, maximum temperatures which are typically in the range of approximately 150 to 250° C. are achieved.

The detachable insertion connection according to the invention between the end(s) of the profiled hose and the end piece(s) has the advantage, which is particularly consequential in practice, that at least each end piece (with corresponding shaping) can be reused, and that with an end piece of this type, which can be used repeatedly if desired, a supporting profiled element which can be reused for a further component manufacturing process can be provided in a simple and cost-effective manner, specifically by simple insertion into an end of the profiled hose (for example of a new profiled hose). Especially if an end piece is provided at each of the two ends of the profiled hose, it is of great advantage to be able to use the same end pieces for providing supporting profiled elements of various lengths (the length of the supporting profiled element is determined by the length of the profiled hose used for forming the supporting profiled element).

The cross-section (profile) of the supporting profiled element should be selected in a manner adapted to the relevant application. This cross-section may in particular be composed of cross-section portions which extend in straight lines, for example in a trapezium shape or in a rectangle, but also for example with one or more cross-section portions which extend in a curve.

For supporting a reinforcing profiled element in the form of what is known as an omega profile, a trapezium-shaped supporting profiled element may for example advantageously be used. For supporting a C reinforcing profiled element, a rectangular supporting profiled element for example is suitable. For supporting a double-T reinforcing profiled element, rectangular supporting profiled elements arranged on both sides thereof may for example be used.

If the fibre composite component having a plurality of different types of reinforcing profiled elements, which is to be produced using fibre composite technology, is to be provided on a (planar) substrate, different supporting profiled elements, which are each adapted to the shaping and arrangement of the reinforcing profiled elements, may also accordingly be used.

What is known as a "pressure shadow" can also advantageously be prevented with the supporting profiled elements according to the invention.

The supporting profiled element according to the invention can be used in particular for supporting a reinforcing profiled element, which is formed from a fibre composite semi-finished product, in a curing process of a method for producing a vehicle fuselage component (in particular an aircraft fuselage component) in which the (at least one) reinforcing profiled element is bonded to a surface of a fuselage shell which is formed from a further fibre composite semi-finished product (what is known as "co-bonding" or "co-curing").

This is of relevance in particular for manufacturing, for example mass-producing, fuselage components in which the fuselage shell has a surface area of several square metres and/or an extent of a plurality of metres in at least one direction.

The term "fibre composite semi-finished product" used herein denotes a material comprising fibres which are embedded in a (cured) matrix material, at the latest after the curing process is complete, and reinforce this matrix material and thus form a "fibre composite component" together with the matrix material. The fibre composite semi-finished product may for example comprise a woven fabric, interlaid scrims, a fibre mat or the like, or contain a textile of this type.

In particular a thermosetting plastics material, such as epoxy resin, may be provided as the matrix material. Each fibre composite semi-finished product which is used in the invention may be provided for example as a "dry" fibre material. Alternatively, the fibre composite semi-finished product may also already be "pre-impregnated" (for example what is known as "prepreg") with the matrix material (for example a synthetic resin system).

Accordingly, in the method explained above for producing a vehicle fuselage component, the fuselage shell and/or the reinforcing profiled element are already in the form of a pre-impregnated fibre composite semi-finished product before the curing process. A prepreg of this type may for example be cured thermally (at an elevated temperature).

However, if the fuselage shell or the reinforcing profiled element is initially in the form of a "dry" fibre composite semi-finished product, this still has to be infiltrated with the relevant matrix material before the actual curing. This infiltration can be carried out for example in the same tool or the same arrangement in which the actual curing is (subsequently) carried out.

The term "curing process" used herein is accordingly intended also to comprise a process in which the actual curing in the stricter sense is preceded by an infiltration step, in which in particular non-pre-impregnated reinforcing profiled elements and/or a non-pre-impregnated fuselage shell are further infiltrated with the matrix material (for example epoxy resin system).

In principle, the supporting profiled element according to the invention can be used for the production of fibre composite components containing any desired fibre materials and matrix materials, in particular ones which are known per se.

Possible fibres include glass fibres, carbon fibres, synthetic plastics material fibres, steel fibres and natural fibres.

In particular plastics materials such as thermosetting plastics materials (synthetic resins) are beneficial as a matrix material. In a special embodiment, the supporting profiled element is used for producing a carbon-fibre-reinforced plastics material component (CFRP component) in particular comprising a matrix based on epoxy resin.

In a preferred embodiment of the supporting profiled element according to the invention, an outer portion which projects from the end of the profiled hose extends at least one of the end pieces of the hose profile in a flush manner. This has advantages in particular in connection with the use of an air-impermeable film, which is laid over the reinforcing profiled element(s) during the curing process.

In this connection, it is also advantageous for an outer portion of an end piece, which projects out of the end of the profiled hose, to have inclined faces for laying an air-impermeable film of this type which is used in the curing process.

In one embodiment, it is provided that an outer portion of the or at least one of the end pieces, which projects out of the end of the profiled hose, is provided with an air passage opening for applying a predetermined pressure to the hose interior during the curing process.

This opening preferably comprises a threaded hole for screwing in an appropriate sleeve-like air passage screw, which makes it possible to apply pressure to the hose interior through an opening (hole) of an air-impermeable film, which lies against the outer portion in a planar manner. In this context, the air passage screw can be used for fixing the film in a sealed manner (between a screw head and the aforementioned outer portion).

In a preferred embodiment, it is provided that an inner portion of an end piece, which projects into the end of the profiled hose, is provided with at least one sealing ring for sealing to the attached end of the profiled hose. A sealing ring of this type may for example be formed from an elastomeric material. In a preferred embodiment, the sealing ring is manufactured from a silicone material.

In a preferred development, the sealing ring is laid in a circumferential groove which is formed on the end piece.

To improve the sealing effect, it may also be provided that a plurality of sealing rings are provided on the end piece, for example each laid in one of a plurality of grooves, which are arranged mutually spaced as seen in the longitudinal direction of the end piece.

In the simplest case, the sealing ring is of a circular cross-section. However, in a development, an elongate sealing ring cross-section is provided, preferably in such a way that the extent of the sealing ring is substantially greater in the longitudinal direction than transverse thereto (for example by a factor of 2 or more).

With a sealing ring which is accommodated in a groove, it is preferred for approximately 10 to 40% of the height of the sealing ring to project out of the groove.

In one embodiment, it is provided that an inner portion of the or at least one of the end pieces, which projects into the end of the profiled hose, is profiled as seen in the longitudinal direction.

Aside from profiling for providing the aforementioned grooves, in this context, alternatively or in addition, in particular a single or multiple gradation of the inner portion may be provided in the longitudinal direction, in such a way that the cross-section or the profile of the inner portion tapers in such a way that it is simpler to attach the profiled hose.

As an alternative or in addition to the aforementioned sealing rings, at least one projection which extends around in the circumferential direction may also be formed from the material of the end piece itself. A sealing effect can also be provided in this manner. If the end piece is manufactured from a relatively rigid material, for example as a milled metal part, the projection which extends around in the circumferential generally does not provide a good (air) sealing effect against the profiled hose, but advantageously provides a mechanical fixing effect. Fixing of this type can for example prevent the end piece from slipping out of the end of the profiled hose during handling (manual or automated) with the supporting profiled element.

In an advantageous embodiment, the aforementioned inner portion of the end piece has a first region, as seen in the longitudinal direction, of a relatively large cross-section and a second region, located further into the hose interior (when the profiled hose is attached), of a comparatively smaller cross-section. These regions can be connected by a gradation and/or chamfering. In this context, the first region preferably comprises one or more sealing rings of the aforementioned type, and the second region preferably comprises at least one projection which extends around in the circumferential direction of the aforementioned type.

The method according to the invention for producing a supporting profiled element for supporting a reinforcing profiled element, which is formed from a fibre composite semi-finished product, in a curing process of a method for producing a vehicle fuselage component, in which the reinforcing profiled element is bonded to a surface of a fuselage shell, which is formed from a fibre composite semi-finished product, is characterised by the steps of:

a) providing a profiled hose, for example by cutting off a portion of a particular length from a virtually continuous supply of an air-impermeable profiled hose, and b) detachably inserting end pieces at the two ends of the provided profiled hose, so as to seal the end pieces to the profiled hose by means of this insertion connection.

If in step a) the profiled hose is provided with an end of the profiled hose which is already sealed at one end, for example by gluing or welding, it is sufficient, as an alternative to step b) as disclosed above, to insert an end piece detachably at the other of the two ends of the provided profiled hose, so as also to provide sealing at this other end (by means of the insertion connection).

The embodiments and details explained above as regards the shaping of the profiled hose and the shaping of the end pieces can also be used analogously, individually or in combination, so as to develop the method according to the invention for producing a supporting profiled element. These developments are accordingly characterised in that a correspondingly configured profiled hose or one or two correspondingly configured end pieces are used in method step a) or in method step b).

A further aspect of the present invention provides a method for producing a reinforced vehicle fuselage component from a fuselage shell, which is formed from a fibre composite semi-finished product, and (at least) one reinforcing profiled element, which is formed from a fibre composite semi-finished product and which is bonded to a surface of the fuselage shell in a curing process of the production method.

According to the invention, (at least) one supporting profiled element of the type disclosed above is used for supporting the (at least) one reinforcing profiled element during this component production process. The component production may for example comprise the following steps:

1. laying the fuselage shell (as a fibre composite semi-finished product, for example as a prepreg) on a mould face (tool), and preparing the required reinforcing profiled element or elements (as a fibre composite semi-finished product, for example already infiltrated and cured), for example by laying a "bonding film" on reinforcing profiled element foot portions which are provided for bonding to the fuselage shell.

2. laying the required supporting profiled element or elements in the relevant profile recess of the reinforcing profiled element or elements, and laying the combination or combinations of reinforcing profiled element and supporting profiled element which are thus produced in the desired position and orientation on the fuselage shell. Alternatively: initially laying the supporting profiled element or elements on the fuselage shell, and only subsequently laying the reinforcing profiled element or elements.

3. producing a space which encloses the fuselage shells along with the reinforcing profiled element(s) and supporting profiled element(s) and provides air-tight sealing from the surroundings, for example by laying a vacuum film, evacuating this space, and preferably carrying out a tightness test. If an autoclave is used, the evacuation and tightness test are preferably provided only after the arrangement is brought into the autoclave.

4. optionally infiltrating the fuselage shell and/or the reinforcing profiled element or elements (if/as much as necessary) with liquid or viscous matrix material, and heating so as to produce the connection (and curing) of the parts.

5. once the curing process is complete: removing the supporting profiled element or elements from the components which is manufactured by "co-bonding" or "co-curing".

In particular when the supporting profiled element or elements which are used for this fibre composite component production are created in advance with a new (not reused) profiled hose, a complex advance test for tightness and any surface damage to the supporting profiled element or elements, before they are laid on the fuselage shell, is generally superfluous in practice. Rather, a tightness test immediately before the actual curing process (heating) is generally sufficient.

By contrast with the procedure outlined above, in a first step the reinforcing profiled element or elements could initially be laid on a mould face (tool) with the supporting profiled element or elements, and the fuselage shell could only be laid subsequently.

In the "curing process", both the fuselage shell and the (at least one) reinforcing profiled element can be cured. However, this is not compulsory. For example, one of the parts "fuselage shell" and "reinforcing profiled element(s)" may already be cured in part or even fully before the curing process in question is carried out. What is important for the bonding, which in this case is in the form of "co-bonding" or "co-curing", of the reinforcing profiled element or elements on the fuselage shell is that there is still liquid or viscous matrix material at the interface between these two parts at the start of the curing process. In one embodiment for example it is provided that, during the curing process, one or more reinforcing profiled elements which are already fully cured are bonded to the fuselage shell (in particular in the form of a prepreg for example), which is not cured or only cured in part. As an alternative or in addition to a part which is not cured, or in any case not fully cured, it is ultimately also possible to provide a matrix material part ("adhesive film", for example of epoxy resin) which is inserted between the parts.

In one embodiment of the production method, the reinforcing profiled element is bonded to the fuselage shell while evacuating a space which encloses the fuselage shell and the reinforcing profiled element, is sealed against the environment, and can be delimited in particular by an air-impermeable film at least on the side of the fuselage shell facing the reinforcing profiled element.

A curing process of this type, which is assisted by negative pressure or vacuum, is known per se in fibre composite technology. However, according to the invention, the manner in which the reinforcing profiled element is supported (optionally a plurality of reinforcing profiled elements) is configured in a particularly advantageous manner (using at least one supporting profiled element according to the invention).

In the context of the invention, it is advantageously possible to turn to all developments which are known per se of the curing process itself (optionally combined with a preceding matrix material infiltration). Purely by way of example, it should be noted that the supporting profiled element according to the invention can also be used in the developed vacuum-assisted infiltration and curing process which is disclosed in the aforementioned DE 101 56 56 213 B4. Further examples of methods which are known per se and are suitable for the use of the present invention include for example resin transfer moulding (RTM), vacuum infusion (for example VAP, VARI, etc.) and developments thereof (for example SLI, LRI, BP-RTM), etc.

In a preferred development of the production method, the curing process is carried out in an autoclave. The aforementioned embodiment of the supporting profiled element—in which, if both ends are equipped with end pieces, at least one of these end pieces is provided with an air passage opening for applying a predetermined pressure to the hose interior—is beneficial in this case in particular. A particularly simple method variant occurs if this predetermined pressure corresponds to the pressure prevailing in the autoclave, and this can be provided for example by using the aforementioned sleeve-like air passage screw, which is screwed into a threaded hole in the relevant end piece and projects into the pressurised space of the autoclave.

Figure 1:
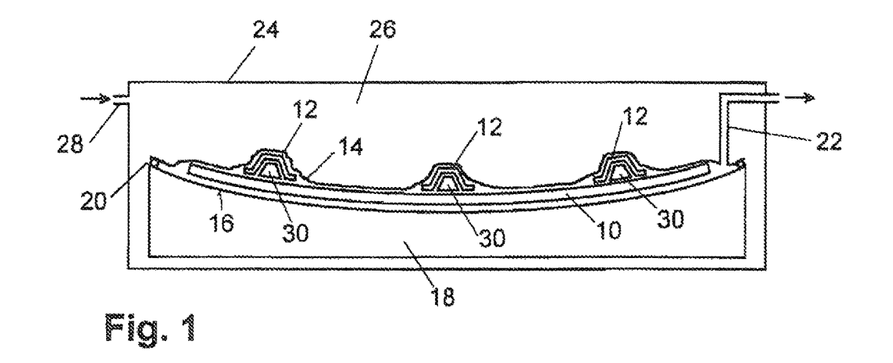
FIG. 1 is a schematic side view of an arrangement for producing a reinforced vehicle fuselage component.

FIG. 1 shows an arrangement for producing a vehicle fuselage component (for example an aircraft fuselage component) form a fuselage shell 10, which is formed from a fibre composite semi-finished product, and three reinforcing profiled elements 12, which are also formed from fibre composite semi-finished products.

In the embodiment shown, the fuselage shell 10 is formed from a pre-impregnated CFRP material ("prepreg"). The fuselage shell 10 has a surface area of several square metres. This surface is curved in a more or less complicated manner. In the schematic sectional view of FIG. 1, for example, a transverse curvature of the fuselage shell 10 can clearly be seen. In the embodiment shown, the reinforcing profiled elements 12 are provided in the form of fibre composite parts, which are already fully cured and which are laid extending on the upper surface in FIG. 1 of the fuselage shell 10 in the longitudinal direction thereof. In this context, the reinforcing profiled elements 12 form what are known as "stringers" (longitudinal reinforcing profiled elements) on the finished vehicle fuselage component, on the inside of the fuselage shell. In general, the reinforcing profiled elements which are bonded according to the invention could also alternatively or additionally form "formers".

In the embodiment shown, the reinforcing profiled elements 12 are what are known as "omega profiled elements". As can be seen from FIG. 1, the cross-section of these profiled elements has two mutually spaced foot portions, which each come into contact with the surface of the fuselage shell 10 and which are interconnected via an arc-shaped cross-sectional region which extends at a distance from the fuselage shell surface. The arc-like cross-sectional region is composed, as shown, of two oblique portions, which are bonded directly to the foot portions and extend obliquely upwards in a straight line, and a central portion, which extends parallel to the foot portions (and interconnects the upper ends of the two oblique portions).

An epoxy resin system which is contained in the fuselage shell 10 (prepreg), and thus the fuselage shell 10, are cured in a thermal curing process, explained in greater detail below, the foot portions of the reinforcing profiled element 12 which are lying on the initially still "wet" fuselage shell face, and thus this reinforcing profiled part 12, being bonded to the fuselage 10 ("co-bonding" or "co-curing" process).

Optionally, so as to improve this bonding, an adhesive film of liquid or viscous epoxy resin or the like may also be previously applied, for example ironed on, to the foot portions of the reinforcing profiled element 12 or to the surface of the fuselage shell 10 (at least in the region of the foot portions).

So as to provide a particularly good connection between the fuselage shell 10 and the reinforcing profiled elements 12, the bonding is carried out with evacuation of a space which encloses the fuselage shell 10 and the reinforcing profiled elements 12 and which is delimited on the upper face in FIG. 1 by an air-impermeable film 14. On the lower side, this space is delimited by a mould face 16 of a moulding tool or a mould 18. The space is evacuated via a ventilation line 22 to a vacuum pump (not shown). The edge of the air-impermeable film 14 is sealed against the mould 18 circumferentially by means of a seal 20 which is arranged on the edge of the mould face 16. As a result of the evacuation, the reinforcing profiled elements 12 are advantageously pressed against the fuselage shell 10, and this fuselage shell 10 is in turn pressed against the mould face 16, during the curing process, in such a way that a particularly integral connection is achieved between the reinforcing profiled elements 12 and the fuselage shell 10, as well as a high dimensional accuracy for the fuselage shell 10.

In the shown embodiment, the pressing of the parts 10, 12 is also further assisted or increased in that before the start of the (thermal) curing process the previously disclosed arrangement is brought into an autoclave (pressure chamber) 24, in the interior 26 of which a pressure greater than the atmospheric pressure, for example of approximately 5 to 10 bar, is set during the curing process. The pressure is set via a pressure line 28, which opens into the interior 26 of the autoclave 24, during the curing process.

However, before the actual curing, in this case by heating the interior 26, is started, a tightness test is preferably carried out with regard to the sealing of the space under the vacuum film 14 (by the seal 20 and the sealing rings 44) and the sealing of the hose interior (by the insertion connections).

In the embodiment shown, supporting profiled elements 30 of a trapezium-shaped cross-section are used during the curing process to support the reinforcing profiled elements 12, and are each arranged in one of the intermediate spaces between the reinforcing profiled elements 12 and the fuselage shell 10, as shown in FIG. 1. Without supporting profiled elements of this type, the reinforcing profiled elements 12 would collapse, or at least be deformed, as a result of the high pressure in the autoclave 24.

Once the curing process is complete, the arrangement of the (now cured) parts is removed from the autoclave 24 again and the supporting profiled elements 30 are removed from this arrangement again, in this case for example drawn from the intermediate spaces in the longitudinal direction of the fuselage 10. This can be simplified, for example, in that the hose interiors are evacuated in advance via the air inlet openings, so as to reduce the transverse extent thereof or the removal resistance thereof. In this context, it should be noted that depending on the specific application the hoses have to be drawn out from the cured construction over a distance of more than 10 m. If it is not necessary to evacuate the hose interiors so as to draw the hoses out in this manner, for example because the hoses are sufficiently flexible, it is conceivable initially to pull the optionally distally arranged end pieces from the respective ends of the profiled hose, instead of evacuating the hose interiors, in such a way that when the profiled hoses are subsequently drawn out, these end pieces do not have to be drawn through the cured construction.

The construction and the function of the supporting profiled elements 30 are described in greater detail in the following with reference to FIGS. 2 and 3.

Figure 2:
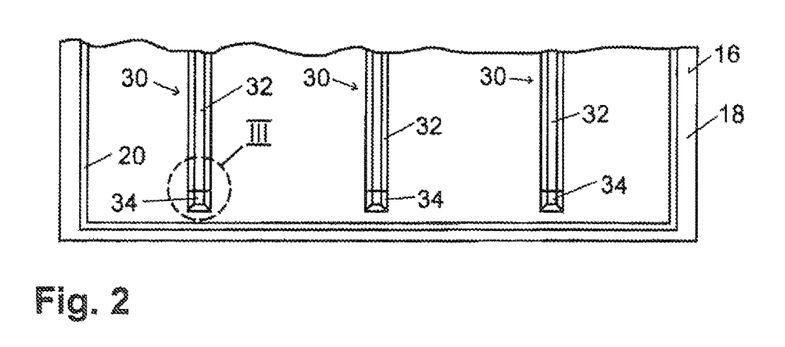
FIG. 2 shows a part of the arrangement of FIG. 1 from above.

FIG. 2 shows part of the arrangement of FIG. 1 from above, but the autoclave 24 and the film 14 are omitted in FIG. 2 for a clearer illustration of the supporting profiled elements 30.

Each of the supporting profiled elements 30 consists of an air-impermeable profiled hose 32 (of a trapezium-shaped cross-section) and end pieces 34 which are detachably inserted at the two ends of the profiled hose and sealed against the profiled hose 32 by means of this insertion connection. In the partial drawing of FIG. 2, only one of the end pieces 34 can be seen for each of the profiled hoses 32.

Figure 3:
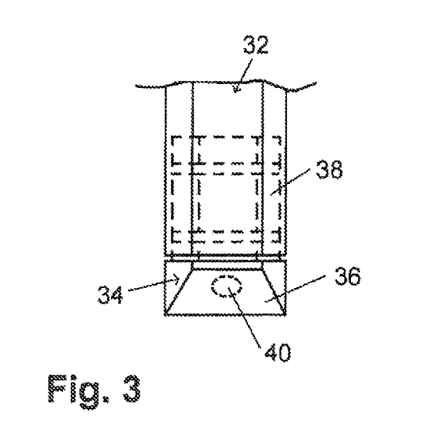

FIG. 3 shows the region denoted as III in FIG. 2, at the end of a profiled hose 32, in greater detail. In the shown embodiment, the profiled hose 32 is in the form of an extruded elastomer hose (for example a silicone hose) of the aforementioned trapezium-shaped cross-section profile, it being advantageously possible to provide the profiled hose 32 for example as a portion which is cut off at a suitable length from a hose supply. The end piece 34 is manufactured for example as a milled aluminium part (alternatively for example a plastics material moulded part) and has an outer portion 36, which projects out of the end of the profiled hose, and an inner portion 38 (in dashed lines in FIG. 3), which projects into the end of the profiled hose. Further, an optionally provided air passage opening 40, via which it is possible to apply pressure to the hose interior during the curing process, is also shown in dashed lines in FIG. 3.

If the curing process takes place at ambient pressure (1 bar) rather than in an autoclave, the supporting profiled elements 30 at both ends could each be closed by a closed end piece 34 (without the opening 40). In particular if the curing is instead carried out at an increased ambient pressure (in an autoclave), it is recommended applying pressure to the respective hose interior at a pressure which at least corresponds to the pressure prevailing in the pressure chamber 26. For this purpose, an end piece 34 having an opening 40 of this type, which provides this pressure application, is preferably provided for each profiled hose 32 at (at least) one end. In a preferred embodiment of each supporting profiled element 30, it has an end piece 34 with an opening 40 at one end and an end piece 34 without an opening 40 of this type at the other end. By contrast with the shown embodiment, hose ends which are closed by means of "closed" end pieces (without an opening 40) in this example could also be closed in a different manner, for example by adhesion, welding or the like.

In the following, an embodiment of an "open end piece" 34*a* is described with reference to FIGS. 4 to 6, and an embodiment of a "closed end piece" 34*b* is described with reference to FIGS. 7 to 9. These end pieces 34*a*, 34*b* may for example be used as the "end piece 34" of the arrangement described above (FIG. 1 to 3).

Figure 4:
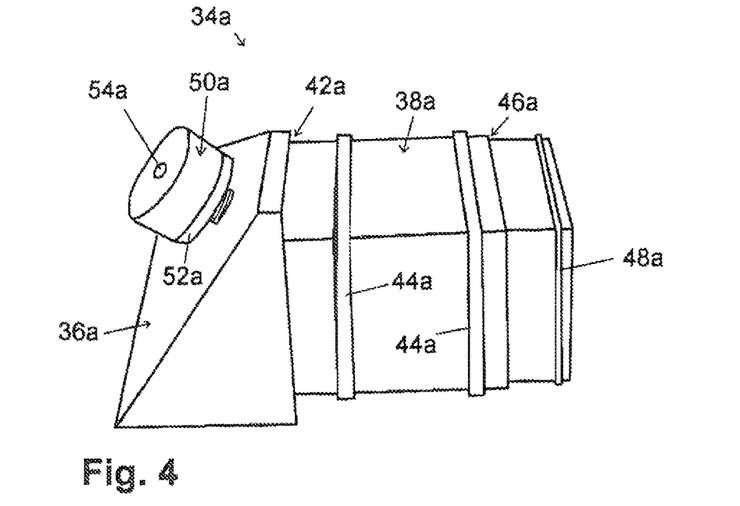
Figure 5:
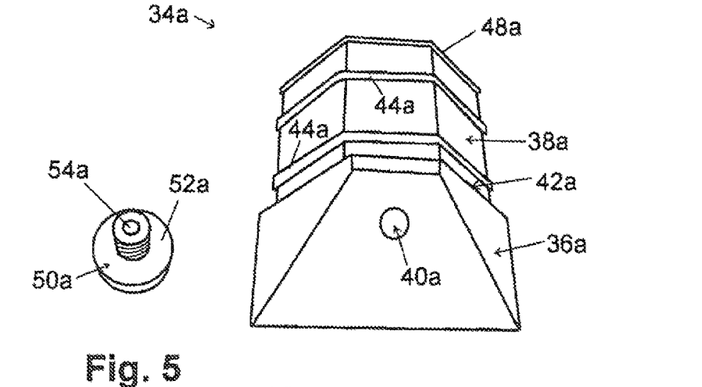
Figure 6:
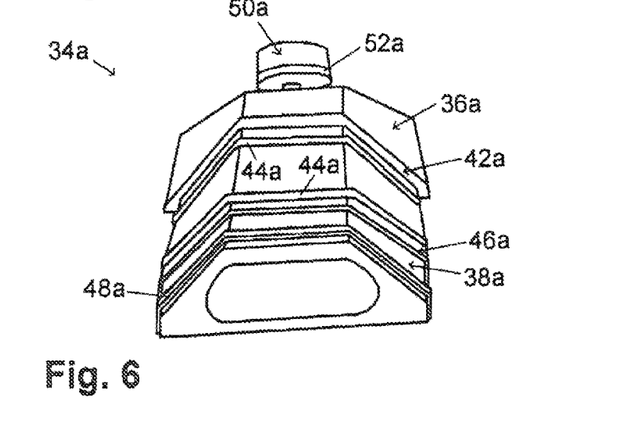

FIGS. 4 to 6 show an end piece 34*a* having an outer portion 36*a* and an inner portion 38*a*. The inner portion 38*a* (projecting into the end of the profiled hose during use) has a reduced (tapered) cross-section by comparison with the outer portion 36*a*, in such a way that when the profiled hose 32 is attached, the profile thereof is extended by the outer portion 36 in a flush manner. This has the advantage that the film 14, which covers the supporting profiled element during the curing process, also lies fully against the ends of each supporting profiled element 30. For this purpose, the inner portion 38*a* is attached to the outer portion 36*a* via a gradation 42*a* which reduces the cross-section, the gradation 42*a* being formed with dimensions corresponding to the thickness of the profiled hose which is attached to the end piece 34*a*. The wall thickness of the profiled hose may for example be approximately a few mm.

Again with a view to the film 14 lying fully in contact, the outer portion 36*a* has an oblique face, in particular also at the left-hand end thereof in FIG. 4, at which the aforementioned air passage opening 40*a* is also formed.

In the shown embodiment, the inner portion 38*a* is provided with two sealing rings 44*a*, which are spaced as seen in the longitudinal direction of the end piece 34*a* and which seal the end piece 34*a* against the inner casing wall of the attached profiled hose 32 during use.

Each of these sealing rings 44*a*, which are formed from an elastomeric material, is of an approximately rectangular cross-section and is laid in a circumferential groove which is suitably dimensioned in the region of the inner portion 38*a*. In the shown embodiment, these grooves are rectangular in cross-section, having a depth of approximately 1 mm, the cross-sectional height of each of the sealing rings 44*a* being dimensioned slightly larger than the groove depth in each case, in such a way that about $1/10$ mm of the sealing rings 44*a* projects out of the associated groove.

Aside from this profiling of the inner portion 38*a*, which forms the grooves for the sealing rings 44*a*, a further gradation 46*a* is provided as profiling in the shown embodiment (as seen in the longitudinal direction), and tapers the cross-section of the inner portion 38*a* further towards the hose interior. A projection 48*a*, which extends around circumferentially on the circumference, is formed in the region of the hose-side end of this further tapered portion.

The projection 48*a* is dimensioned in such a way that it advantageously brings about mechanical fixing of the attached end of the profiled hose, and thus prevents the inserted end piece 34*a* from unintentionally slipping out of the relevant profiled hose end during handling of the supporting profiled element. A circumferential projection of this type, which is formed from the material (in this case for example aluminium) of the relevant end piece, is preferably arranged (as shown) in the direct vicinity of the hose-side end of the inner portion 38*a*.

In the shown embodiment, the air passage opening 40*a* is in the form of a threaded hole for screwing in a sleeve-like air passage screw 50*a*, so as to provide the aforementioned application of pressure to the hose interior during the curing process. For this purpose, a shaft portion, provided with an outer thread, of the screw 50*a* engages through a hole in the air-impermeable film 14 (not shown in FIGS. 4 to 6). Screwing the screw 50*a* tight causes the film regions surrounding this film hole to be clamped between a widened head of the screw 50*a* and the oblique face, visible at the left-hand end in FIG. 4, and sealed against this oblique face. The screw 50*a* is preferably formed with a bordering on the screw head, so as to be simple to actuate, and provided with a suitable sealing disc 52*a* (for example made of elastomeric material), so as to improve the sealing effect. For the passage of air (or pressure equalisation), the screw 50*a* is provided with a central drill-hole 54*a*, which extends in the longitudinal direction of the screw.

Figure 7:
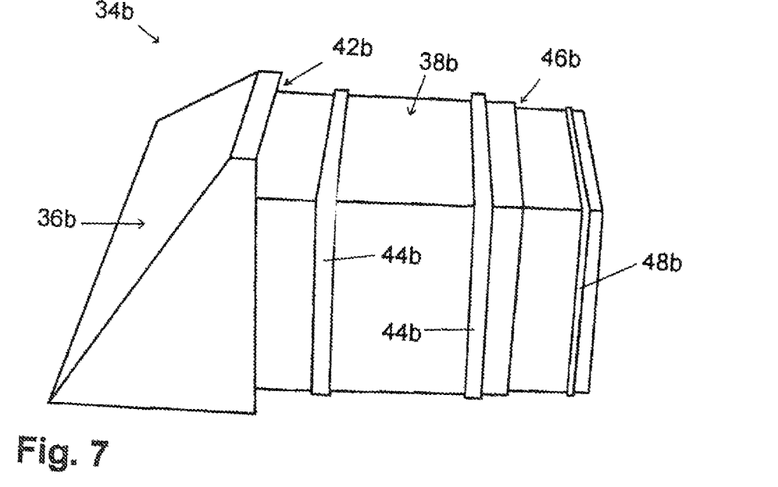
Figure 8:
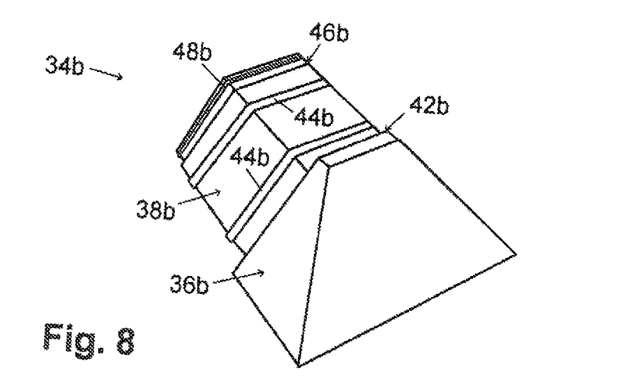
Figure 9:
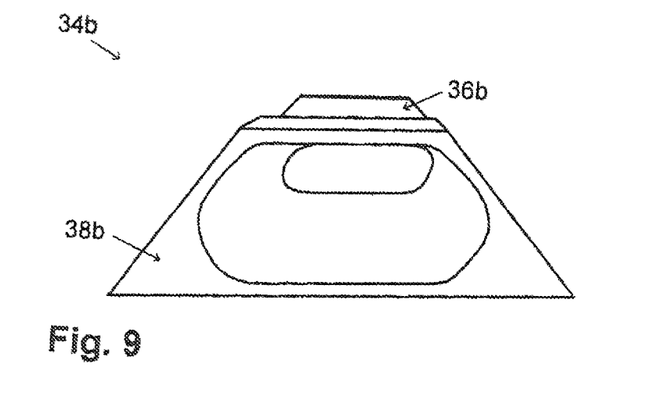

FIGS. 7 to 9 show an embodiment of an end piece 34*b* which substantially corresponds, in terms of construction and function, to the end piece 34*a* disclosed above. Only the air passage opening 40*a* (along with the associated air passage screw 50a) which is provided in the end piece 34a is not provided in the "closed variant" of the end piece 34b.

In FIGS. 7 to 9, functionally equivalent parts are marked with the same reference numerals (as in FIGS. 4 to 6), but with the lower case letter "b" added in each case to distinguish them from the variant according to FIGS. 4 to 6.

During use, the end piece 34b (with the profiled hose 32 attached) forms an air-tight end of the supporting profiled element 30 (ventilation of the relevant supporting profiled element 30 can be provided as discussed via an "open end piece" (34a) which is inserted at the other end of the profiled hose).

In the method illustrated in FIG. 1 for producing a reinforced aircraft fuselage component, the fuselage shell 10, which is formed from a fibre composite semi-finished product, is initially laid on the mould face 16 of the mould 18. Optionally, an adhesive film is subsequently applied to the upper surface of the fuselage 10 in FIG. 1 and/or to the foot portions of the prefabricated reinforcing profiled element 12. Subsequently, the prefabricated reinforcing profiled element 12 is laid on along with the respectively associated supporting profiled elements 30 and finally the air-impermeable film 14.

Before or after the space which is covered by the film 14 is evacuated, the moulding tool 18 is brought into the autoclave 24 together with the parts which are laid on. Subsequently, the pressure chamber 26 of the autoclave 24 is placed under pressure. The entire arrangement is preferably tested for tightness, in advance or after this application of pressure. If the result of this tightness test is satisfactory, the pressure chamber 26 is heated by means of a heating means (not shown). The parts of the component are thus cured and connected, preferably in accordance with a predetermined progression of temperature and pressure over time.

Subsequently, the mould 18 is removed from the autoclave 24 along with the now complete fuselage shell component (cured and rigidly interconnected parts 10, 12), and the film 14 is removed.

After the supporting profiled elements 30 (which have been ventilated again and optionally evacuated) have been removed, at least the end pieces 34 thereof can advantageously be reused (after being cleaned as necessary), so as to provide new supporting profiled elements for manufacturing further fuselage shell components.

Advantageously, a profiled hose can initially be provided for this purpose by cutting off a portion of a predetermined length from a virtually endless supply of an air-impermeable profiled hose, so as subsequently to insert previously used end pieces again, detachably, at both ends of the provided profiled hose.

The supply of profiled hose may advantageously be supplied wound up on a drum for example, the length of the profiled hose which is wound up thereon (for example more than 100 m, in particular more than 200 m) making it possible to cut off a plurality of profiled hose portions, each of the currently required lengths. The supporting profiled elements are thus provided to some extent by way of a construction kit system, it advantageously being possible to select the length of the individual supporting profiled elements individually and as desired by tailoring the hose supply accordingly.

The invention therefore makes it significantly simpler to provide supporting profiled elements which are suitable for the production of fibre composite components, and this in turn greatly reduces the production costs of the relevant fibre composite components.

In particular, the following advantages can be achieved with the invention and the embodiments described above:
  Good, simple sealing is made possible by comparison with a casing such as vacuum film which is used during the production of the component.
  By using reusable end pieces, it is advantageously possible to work with a virtually endless hose material (hose supply) during mass production of reinforced fibre composite fuselage components.
  The length of a supporting profiled element which is to be provided can advantageously be adapted in a simple manner to the length of the relevant reinforcing profiled element. Each reinforcing profiled element can end at any desired point on the relevant "substrate" (for example fuselage shell).
  Supporting profiled elements are provided according to the invention by way of a simple, modular insertion principle, in which at least the (relatively expensive) end pieces are reusable.
  It is advantageously possible to seal the profiled hose interiors without an additional sealing measure (such as adhesion). In particular, by using an autoclave for the curing process, a sufficiently good sealing effect in the insertion connection can still be ensured.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

What is claimed is:

1. A method for producing a supporting profiled element configured to support a reinforcing profiled element that is formed from a fiber composite semi-finished product during a curing process of a method for producing a vehicle fuselage component, in which the reinforcing profiled element is bonded to a surface of a fuselage shell that is formed from a fiber composite semi-finished product, the method comprising:
  a) providing a profiled hose, and
  b) detachably inserting end pieces at the two ends of the provided profiled hose, so as to seal the end pieces to the profiled hose by means of respective insertion connections, a first end piece comprising an oblique face with an air passage opening disposed therein and an air passage screw, the air passage screw having a widened head configured to clamp an air-impermeable film that surrounds the air passage opening between the widened head and the oblique face and configured to seal the air-impermeable film against the oblique face, wherein the air passage opening comprises a threaded hole configured for receiving the air passage screw, wherein the air passage screw comprises a shaft portion having an outer thread configured to engage through a hole in the air-impermeable film, wherein the air passage screw comprises a sealing disc that faces the oblique face upon insertion of the air passage screw into the threaded hole of the air passage opening and wherein the air passage screw is sleeve-like as a result of a central drill-hole that extends in a longitudinal direction of the air passage screw.

2. The method according to claim 1, wherein the providing the profiled hose includes cutting off a portion of a particular length from a virtually continuous supply of an air-impermeable profiled hose.

* * * * *